H. J. YAGER.
NUT LOCK.
APPLICATION FILED JUNE 30, 1915.
1,171,294.
Patented Feb. 8, 1916.
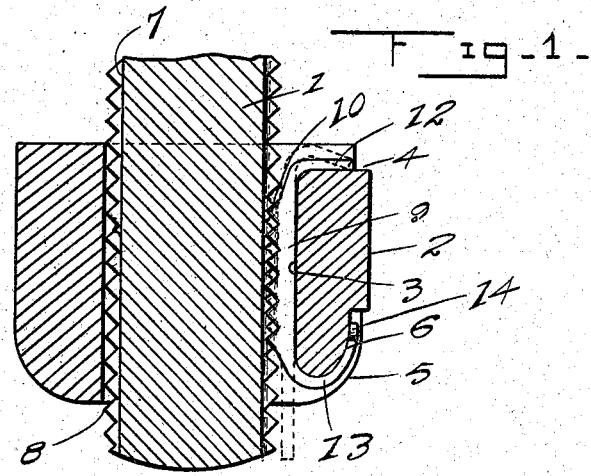
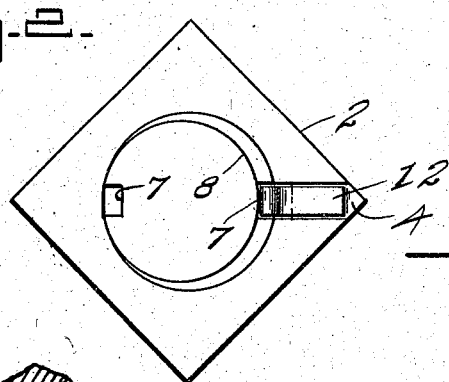
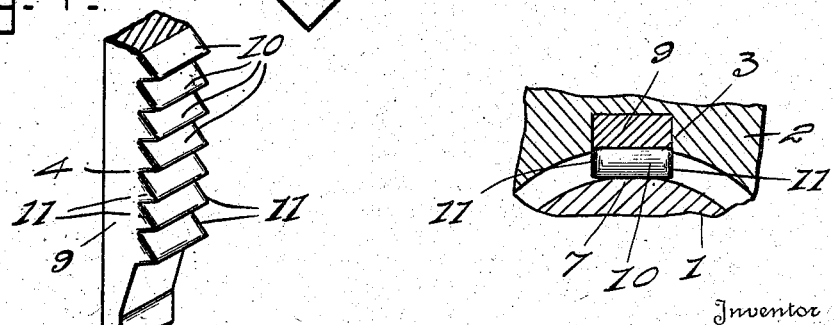
Witnesses
C. P. Beall.
J. A. Garner.
Inventor
H. J. Yager,
By
Attorney

UNITED STATES PATENT OFFICE.

HARVEY J. YAGER, OF SEATTLE, WASHINGTON.

NUT-LOCK.

1,171,294. Specification of Letters Patent. Patented Feb. 8, 1916.

Application filed June 30, 1915. Serial No. 37,284.

*To all whom it may concern:*

Be it known that I, HARVEY J. YAGER, a citizen of the United States, residing at Seattle, in the county of King and State of Washington, have invented certain new and useful Improvements in Nut-Locks; and I do hereby declare the following to be a full, clear, and exact description of the invention, such as will enable others skilled in the art to which it appertains to make and use the same.

This invention relates to improvements in nut locks and especially with reference to the provision of a locking key for use in connection with a nut for locking the latter on a bolt after the nut has been screwed on the bolt as hereinafter more fully described and claimed.

In the accompanying drawings; Figure 1 is a vertical sectional view of a bolt and a nut and locking key arranged on the bolt and constructed in accordance with my invention. Fig. 2 is an end elevation of the same. Fig. 3 is a transverse sectional view of the same. Fig. 4 is a detail perspective view of the locking key.

The bolt 1 has the usual threaded shank. In accordance with my invention I provide the nut 2 which is adapted to be screwed on the bolt with a key groove 3 which is parallel with the axis of the nut, is arranged at one side of the bore of the nut and extends from the inner side of the nut to its outer side. At the inner end of the groove 3 is an outwardly extending recess 4. At the outer end of the key groove 3 the nut is provided with a groove or recess 5, the bottom of which is rounded as at 6. The bolt shank is provided with one or more longitudinal channels 7 which intersect its threads. The bore of the nut is threaded as at 8 to match the threads of the bolt. In connection with the nut I provide a locking key 9 which is arranged in the groove 3 of the nut and for slight longitudinal movement and is made of soft steel, iron or other metal which may be readily bent. This locking key is provided with threads 10 to match those of the bolt and nut and the said threads 10, which are segmental, are beveled at the edge as at 11. At the inner end of the key is a bendable arm 12 and at its outer end is a similar arm 13 which is formed with a head 14 that presents lugs 15 on opposite sides.

Initially the key is arranged in the groove 3 of the nut, with its inner end 12 bent at such an angle as to engage the bottom of the recess 4 and hold the threads of the key in registry with those of the nut and bolt so that the nut may be readily screwed on the bolt. The beveled edges 11 of the key threads facilitate the engagement of the key threads with those of the bolt as the key passes the channels 7 of the bolt during the turning of the nut. When the nut has been screwed on the bolt as far as is desired the head 14 of the arm 13 of the key is engaged by the claw of the hammer or by other suitable means and the said arm 13 is bent outwardly and caused to fit in the bottom of the curved groove 5 of the nut, the tension on the key serving to move the latter longitudinally a slight distance so as to arrange the threads of the key out of alinement with those of the nut and bolt, care having been taken to stop the nut at a time when the key is in registry with one of the bolt channels 7. The threads of the key being thus arranged in staggered relation to those of the nut and bolt and the key being secured in the nut in such position, it will be evident that the key effectually locks the nut on the bolt and prevents the same from turning.

Having thus described my invention I claim:—

1. In combination with a bolt having a longitudinal channel extending across its threads, a nut threaded to engage the bolt and having a longitudinal groove communicating with its bore, and a locking key extending through said groove, arranged for slight longitudinal movement therein and having segment threads to match those of the nut and bolt, said key having bendable end extensions adapted to be engaged with the inner and outer sides of the nut to hold the key in initial position with its threads and register with those of the nut and bolt and to lock the key in locking position with its threads in the channel of the bolt and out of registry with the threads of the nut and bolt.

2. In combination with a bolt having a longitudinal channel extending across its threads, a nut threaded to engage the bolt and having a longitudinal groove communicating with its bore, and a locking key extending through said groove, arranged for slight longitudinal movement therein and having segment threads to match those of the nut and bolt, said key having bendable end extensions adapted to be engaged with the inner and outer sides of the nut to hold the key in initial position with its threads and register with those of the nut and bolt and to lock the key in locking position with its threads in the channel of the bolt and out of registry with the threads of the nut and bolt, said nut having a radial groove at its inner side bendable arm of the key and also having a curved groove in its outer side for engagement by the other bendable arm of the key, the last named arm having a head providing oppositely projecting lugs for engagement by a hammer claw or other implement.

In testimony whereof I affix my signature in presence of two witnesses.

HARVEY J. YAGER.

Witnesses:
 CRAWFORD E. WHITE,
 JOHN P. GALLAGHER.